Patented Sept. 29, 1925.

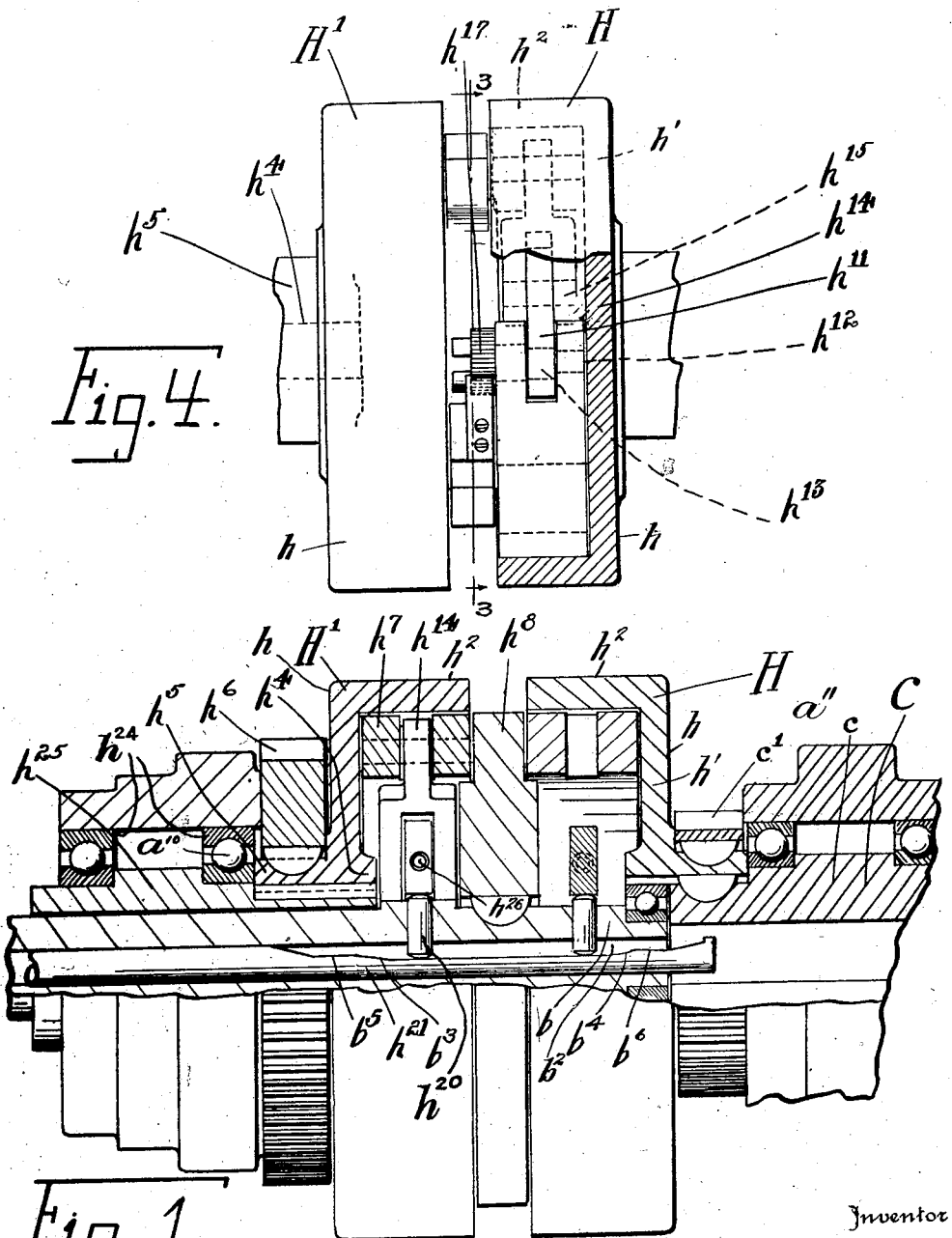

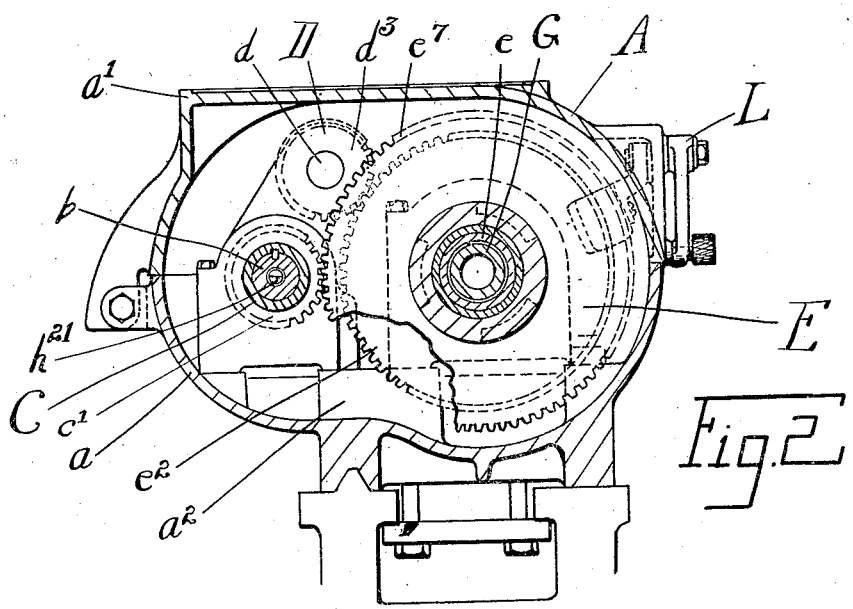
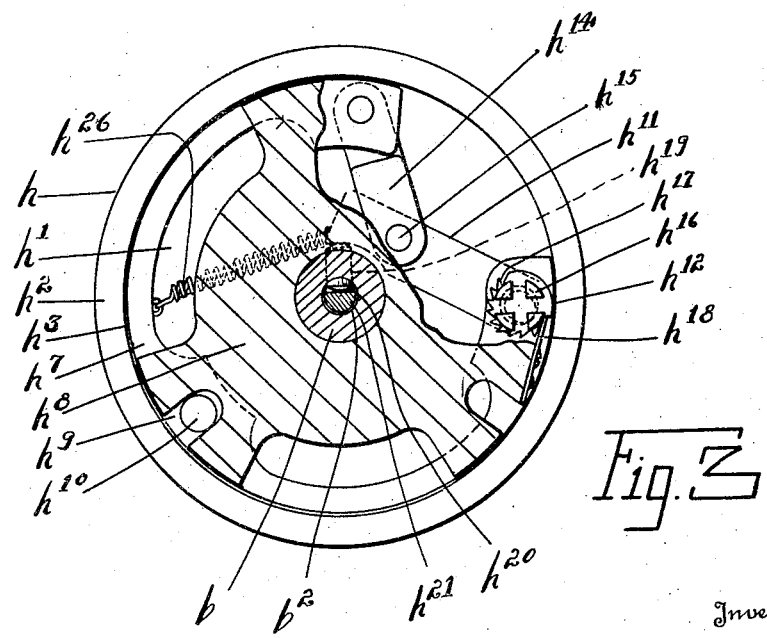

1,555,200

UNITED STATES PATENT OFFICE.

GUSTAF A. GRANLUND, OF CINCINNATI, OHIO, ASSIGNOR TO THE GREAVES KLUSMAN TOOL COMPANY, OF CINCINNATI, OHIO, A CORPORATION OF OHIO.

POWER-TRANSMISSION MECHANISM.

Application filed May 31, 1921. Serial No. 473,671.

To all whom it may concern:

Be it known that I, GUSTAF A. GRANLUND, a citizen of the United States of America, and a resident of Cincinnati, in the county of Hamilton and State of Ohio, have invented a new and useful Improvement in a Power-Transmission Mechanism, of which the following is a specification.

An object of my invention is to provide a friction clutch mechanism that is simple and positive in operation.

Another object is to provide a device of this kind that may be readily adjusted to take up wear on the friction surface.

Another object is to provide a device of this kind wherein the driven members are operatively connected to the forward and reverse gearing respectively of a machine upon which the clutch is used.

These and other objects are attained by the means described herein and disclosed in the accompanying drawings, in which—

Fig. 1 is a fragmental view of a lathe head having embodied therein a device of my invention, part being shown in cross section.

Fig. 2 is a vertical section of a lathe head showing the device mounted therein.

Fig. 3 is a cross sectional view on line 3—3 of Fig. 4.

Fig. 4 is a fragmental elevational view, parts being broken away.

My invention comprises a main drive shaft $b$ upon which are mounted clutches H and H′ through which power is transmitted either in a forward or a reverse direction to a sleeve $e$, upon which is mounted a series of gears $e^7$, which gears are at all times in driving engagement with gears driven directly by the clutch mechanisms. The gears $e^7$ mounted upon the sleeve $e$ are adapted to either drive the sleeve, or to be revolubly actuated upon the sleeve, the sleeve having mounted upon it a second series of gears which may be either driven by the sleeve or be revolubly actuated upon the sleeve, the second series of gears being at all times in engagement with the gears mounted on a counter shaft $f$, from which counter shaft the live spindle or driven shaft is driven.

The clutches are revolubly mounted upon the shaft $b$ and either one may be operated upon so as to be driven by the drive shaft. One clutch is adapted to transmit motion to an auxiliary drive mechanism C, and the other is adapted to transmit motion to a reverse drive mechanism D.

The clutch mechanisms H and H′ are substantially the same and a description of one will suffice for both. Each clutch mechanism comprises a housing $h$ comprising a radial plate $h'$ about the periphery of which extends a flange $h^2$ having its inner surface $h^3$ substantially concentric with the shaft $b$, upon which the clutch mechanism is mounted. A hub $h^4$ is formed upon the centermost portion of the plate $h'$ and upon the hub is formed a flange $h^5$. The flange $h^5$ of the forward drive clutch H is keyed to the auxiliary drive shaft $c$. The flange $h^5$ of the reverse drive clutch H′ is mounted upon the sleeve $h^{25}$ revolubly supported by ball bearing $h^{24}$, and the flange $h^5$ has mounted upon it and keyed to it the gear $h^6$, which meshes with a gear mounted on the reverse drive shaft $d$. Contained interiorly to the annular flange $h^2$ formed on the housing, is a split clutch shoe $h^7$. Normally the clutch shoe is disengaged from the inner surface $h^3$ of the flange $h^2$, but when the clutch shoe is expanded, it binds upon and makes a frictional driving contact with the flange $h^2$ of the housing. A block $h^8$ is mounted upon the shaft $b$ and is keyed thereto. This block is disposed intermediate the housings $h$. The block has a series of radial notches $h^9$ in which are slidably mounted pins $h^{10}$ engaging the clutch shoes disposed within the clutches H′ and H. In this way the rotatory movement of the shaft $b$ is transmitted to the clutch shoes $h^7$. Each clutch shoe has mounted upon one of its ends adjacent the split therein, a lever arm $h^{11}$. The lever arm is pivotally mounted upon a pin $h^{12}$ extending through one of the bifurcated ends of the clutch shoe. This pin has formed upon it a bearing $h^{13}$ eccentric to the axis of the pin and upon this eccentric part of the pin is mounted the lever arm $h^{11}$. From this it is readily apparent that by revolubly actuating the pin, it is possible to reciprocate the lever arm $h^{11}$. This arrangement is used for the purpose of adjusting the device. The free end of the lever $h^{11}$ extends to a place immediately adjacent the shaft $b$ and is retained in proximity to the shaft $b$ by means of a link $h^{14}$, one end of which is pivotally mounted between the branches of the second bifurcated end of the clutch shoe. The link $h^{14}$ has a bifurcated end, the branches of which extend on either side of the lever arm $h^{11}$ and which ends are pivotally connected to the lever arm by means of a pivot $h^{15}$. The end of the pin adjacent the block $h^8$ has formed upon it a head $h^{16}$ upon which a series of circumferential ratchet teeth $h^{17}$ are formed. A spring plate $h^{18}$ is mounted upon the block $h^8$ and is adapted to engage the teeth formed on the pin. From the foregoing it is readily apparent that by revolubly actuating the pin, the spring plate $h^{18}$ will engage in different notches between different teeth, and will serve to retain the eccentric portion of the pin in an adjusted position. The head of the pin is preferably cross slotted, as shown in Fig. 3, to permit ready adjustment of the pin. The shaft $b$ has formed within it radial slots $h^{19}$ registering with those places over which the lever arms $h^{11}$ extend. Within the slots $h^{19}$ are reciprocally mounted the pins $h^{20}$. The ends of the pins $h^{20}$ are preferably rounded. A reciprocating rod $h^{21}$ is mounted within the bore $b^2$ of the shaft $b$. The reciprocating rod has formed upon it the tapered faces $b^3$ and $b^4$, see Fig. 1, terminating upon the shoulders $b^5$ and $b^6$ respectively. The centermost parts of the pins $h^{20}$ engage the reciprocating rod $h^{21}$, and the outermost parts of the pins engage the lever arms $h^{11}$. The springs $h^{26}$ retain the lever arms $h^{11}$ in engagement with the pins $h^{20}$. Suitable means such as a yoke may be mounted upon the end of the reciprocating rod $h^{21}$, which extends from the shaft, and whereby the reciprocating rod may be longitudinally actuated within the bore of the shaft. A fork engages the yoke.

The operation of my device is as follows: Normally the clutch shoes are disengaged from the clutch flanges $h^2$. Motion is transmitted to the main drive shaft or shaft $b$. We will assume that the parts are in the positions as shown in Fig. 1. The reciprocating rod $h^{21}$ is moved longitudinally into the bore in the main drive shaft, whereupon the pin $h^{20}$ of the reverse drive clutch H' is moved outwardly by the engagement of the pin upon the tapered face $b^3$, and the shoulder $b^5$ formed on the reciprocating rod. The outward movement of the pin $h^{20}$ moves the lever arm $h^{11}$ and the link $h^{14}$, about their pivotal mountings and causes the lever arm and the link to expand the clutch shoe, whereupon the clutch shoe binds upon the clutch flange and motion is transmitted from the main drive shaft $b$ to the reverse drive mechanism by way of the gear $h^6$. When the reciprocating rod $h^{21}$ is moved longitudinally out of the bore in the shaft $b$, the forwardly driving clutch H is driven from the shaft and motion is transmitted from the clutch H to the auxiliary drive shaft $c$. Motion from the auxiliary drive shaft is imparted to the primary gears $e^7$ by means of the gear $c'$ keyed upon the auxiliary drive shaft and the primary gear $e^7$ is revolubly actuated upon the sleeve $e$ without actuating the sleeve $e$. The entire mechanism contained within the casing A is immersed in oil.

A spring $h^{26}$ may be employed to retain the clutch shoe in normally disengaged relation to the housing $h$. The reciprocating rod $h^{21}$ may have inclined surfaces exposed to the pins $h^{20}$ on both sides of the shoulders or landings $b^4$ and $b^6$. This is an additional means of overcoming wear.

What I claim is:

1. A clutch mechanism comprising a shaft having an axial bore and a radial bore communicating with the axial bore, a block mounted on the shaft, a housing revolubly mounted on the shaft over the radial bore therein, a split clutch shoe within the housing mounted for rotation with the block, a pin revolubly mounted on one end of the clutch shoe, an eccentric bearing mounted intermediate the ends of said pins, a lever arm on the eccentric bearing, a notched flange on the eccentric bearing, a spring engaging the notches in the notched flange for securing said bearing against rotation and providing an adjustment for the lever arm, a link pivotally mounted on the lever arm and the free end of the clutch shoe, a shouldered rod reciprocable in the axial bore in the shaft, a pin in the radial bore in the shaft actuated by the shouldered rod for moving the lever arm whereby the clutch shoe is expanded to frictionally engage the housing, and yielding means for holding the lever arm in engagement with the pin in the radial bore in the shaft.

2. A clutch mechanism comprising a shaft having an axial bore and a radial bore communicating with the axial bore, a housing revolubly mounted on the shaft adjacent the radial bore, a split clutch shoe within the housing and mounted for rotation with the shaft, a revoluble pin on one end of the clutch shoe, an eccentric bearing intermediate the ends of the pin, a lever arm mounted on the bearing, ratchet means securing the bearing against rotation for adjusting the lever arm, a link connecting the lever arm and the free end of the clutch shoe, a shouldered rod mounted for reciprocation in the axial bore in the shaft, a pin extending through the radial bore in the shaft and adapted to be actuated by the shouldered rod for moving the lever arm whereby the clutch shoe is expanded, and yielding means for holding the lever arm against the end of the pin.

3. A clutch mechanism comprising a shaft having an axial bore and a communicating radial bore therein, an expansible split clutch shoe mounted for rotation with the shaft, a freely revoluble housing carried by the shaft, an eccentric bearing rotatably adjustable on one end of the clutch shoe, a pivotally mounted link on the other end of the clutch shoe, a lever arm having its opposite ends pivotally mounted on the bearing and the free end of the link, a pin reciprocally carried in the radial bore in the shaft and having its one end in abutment with the lever arm, and a shouldered rod in the axial bore in the shaft for moving the pin whereby the lever arm is actuated to expand the clutch shoe.

In testimony whereof, I have hereunto subscribed my name this 26th day of May, 1921.

GUSTAF A. GRANLUND.